US009285542B2

(12) United States Patent
Barwicz et al.

(10) Patent No.: US 9,285,542 B2
(45) Date of Patent: Mar. 15, 2016

(54) FIBER OPTIC INTERFACE WITH ADHESIVE FILL SYSTEM

(71) Applicants: International Business Machines Corporation, Armonk, NY (US); AFL Telecommunications LLC, East Duncan, SC (US)

(72) Inventors: Tymon Barwicz, Yorktown Heights, NY (US); Eddie Kimbrell, Dacula, GA (US); Ted Lichoulas, Simpsonville, SC (US)

(73) Assignees: International Business Machines Corporation, Armonk, NY (US); AFL TELECOMMUNICATIONS LLC, East Duncan, SC (US)

( * ) Notice: Subject to any disclaimer, the term of this patent is extended or adjusted under 35 U.S.C. 154(b) by 0 days.

(21) Appl. No.: 14/327,117

(22) Filed: Jul. 9, 2014

(65) Prior Publication Data
US 2016/0011372 A1 Jan. 14, 2016

(51) Int. Cl.
*G02B 6/00* (2006.01)
*G02B 6/24* (2006.01)
*B29C 65/48* (2006.01)
*B29D 11/00* (2006.01)

(52) U.S. Cl.
CPC ............ *G02B 6/241* (2013.01); *B29C 65/4845* (2013.01); *B29D 11/0075* (2013.01)

(58) Field of Classification Search
CPC ... G02B 6/3849; G02B 6/3887; G02B 6/4471
USPC .............................. 385/139, 137, 114, 88, 51
See application file for complete search history.

(56) References Cited

U.S. PATENT DOCUMENTS

| 5,671,315 | A  | * | 9/1997  | Tabuchi et al. ............... 385/137 |
|-----------|----|---|---------|---------------------------------------|
| 6,257,772 | B1 | * | 7/2001  | Nakanishi et al. ............. 385/89  |
| 6,517,257 | B2 | * | 2/2003  | Nishikawa et al. ............ 385/88   |
| 6,553,173 | B1 | * | 4/2003  | Goto ............................ 385/137 |
| 7,197,224 | B2 |   | 3/2007  | Rolston et al.                        |
| 7,223,025 | B2 |   | 5/2007  | Benzoni et al.                        |
| 7,345,316 | B2 | * | 3/2008  | Sherrer et al. ................. 257/98 |
| 7,616,852 | B2 |   | 11/2009 | Ohtsu et al.                          |
| 7,794,158 | B2 |   | 9/2010  | Yasuda et al.                         |
| 8,534,927 | B1 |   | 9/2013  | Barwicz et al.                        |
| 8,545,108 | B1 |   | 10/2013 | Barwicz et al.                        |

(Continued)

OTHER PUBLICATIONS

List of IBM Patents or Patent Applications Treated as Related; Jul. 10, 2014; pp. 1-2.
Tymon Barwicz, et al., "Material Structures for Front-End of the Line Integration of Optical Polarization Splitters and Rotators," Related U.S. Appl. No. 13/835,725, filed Mar. 15, 2013.

(Continued)

*Primary Examiner* — Ellen Kim
(74) *Attorney, Agent, or Firm* — Cantor Colburn LLP; Vazken Alexanian

(57) ABSTRACT

A fiber optic interface for a fiber optic ribbon includes a homogeneous flexible body comprising one or more grooves defined therein, each groove configured to receive a corresponding filament of the fiber optic ribbon. Each groove is further configured to receive an adhesive to attach the groove to a first portion of a corresponding filament while leaving a second, opposing portion of the corresponding filament and lateral side portions of the corresponding filament between the first and second portions substantially accessible for connection to a mating component. An overflow port for each groove provides an opening extending from a corresponding groove through the body of the interface for draining excess adhesive from the groove.

18 Claims, 8 Drawing Sheets

(56) References Cited

U.S. PATENT DOCUMENTS

| | | |
|---|---|---|
| 8,724,937 B2 | 5/2014 | Barwicz et al. |
| 2002/0114577 A1* | 8/2002 | Kondo et al. .................... 385/51 |
| 2003/0133688 A1* | 7/2003 | Wing Leung et al. ......... 385/137 |
| 2005/0254770 A1* | 11/2005 | Watanabe ..................... 385/137 |
| 2006/0291793 A1* | 12/2006 | Carpenter et al. ............. 385/137 |
| 2010/0310214 A1 | 12/2010 | Miyadera et al. |
| 2012/0089180 A1 | 4/2012 | Fathi et al. |
| 2012/0275748 A1 | 11/2012 | Yamaguchi et al. |
| 2013/0156365 A1 | 6/2013 | Barwicz et al. |
| 2014/0177222 A1 | 6/2014 | Barwicz et al. |
| 2014/0179034 A1 | 6/2014 | Barwicz et al. |
| 2015/0177466 A1 | 6/2015 | Barwicz et al. |

OTHER PUBLICATIONS

Tymon Barwicz, et al., "Material Structures for Front-End of the Line Integration of Optical Polarization Splitters and Rotators," Related U.S. Appl. No. 13/971,390, filed Aug. 20, 2013.

Tymon Barwicz, et al., "Fiber Pigtail With Integrated LID," Related U.S. Appl. No. 13/804,269, filed Mar. 14, 2013.

Tymon Barwicz, et al., "Dual-Polymer Fiber Optic Interface With Melt-Bond Adhesive," Related U.S. Appl. No. 14/327,140, filed Jul. 9, 2014.

List of IBM Patents or Patent Applications Treated as Related; Date Filed: Jul. 9, 2014; pp. 1-2.

\* cited by examiner

FIBER OPTIC INTERFACE WITH ADHESIVE FILL SYSTEM

BACKGROUND

The present invention relates generally to fiber optic communications and, more specifically, to a flexible fiber optic interface for placement between a fiber optic ribbon and a mating component such as an optical waveguide, semiconductor die, or terminal connector, and having an adhesive fill system for bonding the interface to exposed filaments of the ribbon.

Typically, fiber optic cables need to have connectors fitted before they can attach to other equipment. Fiber optic interfaces, also referred to as lids or stubs, provide a solution for terminating the fiber with connectors. From a conventional view, a fiber optic interface is often placed at the end of a fiber ribbon or pigtail, which is typically a short, exposed length of optical fiber ribbon broken out from a larger fiber bundle. The pigtail is usually positioned adjacent to another piece of equipment requiring connection to the fiber pigtail. The interface physically attaches to first portions of the exposed optic filaments, while also attaching to, and placing second portions of the exposed filaments in contact with, a receiving piece of equipment to make a physical and optical connection between the pigtail and the receiving piece of equipment.

For example, a fiber optic interface may be used to physically and optically connect the fiber optic ribbon to a mating component such as a waveguide, semiconductor die, a terminal connector, etc. The fiber optic interface should meet a number of objectives, including providing a secure connection to the optical fibers, leaving a portion of the fibers exposed for connection to the mating component, making a secure connection with the mating component in view of conditions of the material, shape and rigidity of the receiving interface as wells as environmental conditions, such coefficients of thermal expansion, vibration, moisture, vapors, chemicals, and other aspects of the intended operating environment.

SUMMARY

In one embodiment, a fiber optic interface for a fiber optic ribbon includes a homogeneous flexible body comprising one or more grooves defined therein, each groove configured to receive a corresponding filament of the fiber optic ribbon. Each groove is further configured to receive an adhesive to attach the groove to a first portion of a corresponding filament while leaving a second, opposing portion of the corresponding filament and lateral side portions of the corresponding filament between the first and second portions substantially accessible for connection to a mating component. An overflow port for each groove provides an opening extending from a corresponding groove through the body of the interface for draining excess adhesive from the groove.

In another embodiment, a fiber optic termination includes an exposed length of fiber optic filaments and an interface, including a homogeneous flexible body having a plurality of grooves defined therein, each groove receiving a corresponding filament of the ribbon. Each groove carries an adhesive to attach the groove to a first portion of a corresponding filament while leaving a second, opposing portion of the corresponding filament and lateral side portions of the corresponding filament between the first and second portions substantially accessible for connection to a mating component. Each groove further includes an overflow port extending from a corresponding groove through the body of the interface.

In another embodiment, a method for manufacturing a fiber optic termination includes forming an interface having a homogeneous flexible body having a plurality of grooves defined therein, each groove receiving a corresponding filament of ribbon length of optical ribbon comprising a plurality of exposed optical filaments. Each groove carries an adhesive to attaching the groove to a first portion of a corresponding filament while leaving a second, opposing portion of the corresponding filament and lateral side portions of the corresponding filament between the first and second portions substantially accessible for connection to a mating component. Each groove further includes an overflow port extending from a corresponding groove through the body of the interface. The method further includes applying an adhesive in the grooves; placing the filaments on the adhesive in the grooves with each filament placed adjacent to a corresponding groove; squeezing the filaments into the grooves with a force sufficient to push excess adhesive from the grooves through the overflow ports; and applying one of: near ultraviolet, ultraviolet or infrared light to the body to cure the adhesive.

Additional features and advantages are realized through the techniques of the embodiments of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1A:
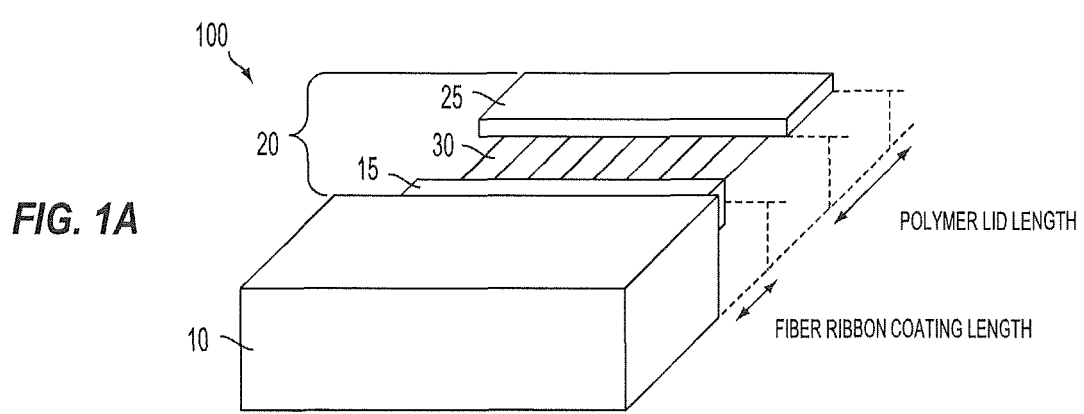
FIG. 1A is a perspective view of one type of pigtail connection utilizing a fiber optic interface.
Figure 1B:
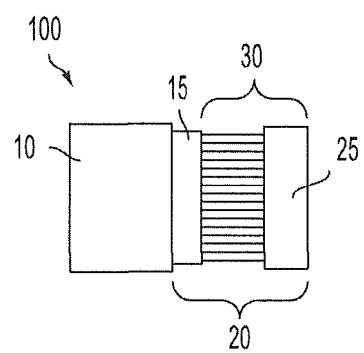
FIG. 1B is a top view of FIG. 1A.
Figure 1C:
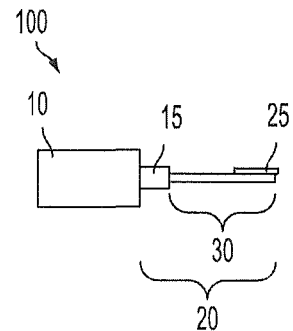
FIG. 1C is a side view of FIG. 1A.

Embodiments of the invention may be realized in a fiber optic interface configured for placement between a fiber optic ribbon and a mating component such as, for example, a waveguide, semiconductor die, or terminal connector. The fiber optic interface is manufactured from a flexible material having desirable properties and includes an integral adhesive fill system for bonding the interface to the ribbon. The interface is amenable to mass production through injection molding and may utilize an adhesive cured with near ultraviolet (blue), ultraviolet (UV) or infrared (IR) light to attach to the filaments. The adhesive fill system facilitates application, spreading, and removal of excess adhesive allowing the adhesive to be neatly applied and distributed between the interface and the exposed filaments while avoiding damage to the fibers.

The fiber optic interface is manufactured from a flexible polymer that meets a number of objectives, including providing a secure connection to the optical fibers, leaving a portion of the fibers exposed for connection to a mating component, and flexing to adjust to the shape of a rigid mating component. The interface also demonstrates a number of properties producing a robust connection, such as desirable pliability, vibration tolerance, low coefficient of thermal expansion (CTE), low moisture absorption, and chemical inertness. The interface is sized to facilitate part placement using pick and place machines and may also provide connection points for a vacuum tool or connector used in mechanical assembly equipment. The interface may also provide optical fiducials for machine vision alignment.

Generally, fiber pigtails are known in the fiber optic industry and a variety of techniques have been used to assemble fibers to V-grooves and U-grooves defined on substrates. The assembly of a fiber pigtail to a substrate generally requires that a glass plate be applied on top of the fibers to maintain the fibers in the grooves while the adhesive cures. This approach usually requires the simultaneous use of two mechanical arms or fixtures, one to hold the fibers while the other pushes the glass plate down.

Mass producing fiber interfaces suitable for high speed data processing by traditional approaches is known to be labor intensive. Conventional synthetic materials and adhesives required to attach the fiber interfaces to semiconductor chips (also referred to as dies) mounted on printed circuit boards and processors used in the Surface Mount Technology (SMT) manufacturing lines are becoming obsolete due to increased production temperatures associated with the adoption of the restrictions on hazardous substances (RoHS) initiative. UV transparent materials currently in use are not capable of handling the higher temperatures needed for soldering processes compliant with the RoHS initiative.

Conventional V-groove fiber assemblies use rigid materials that keep the fibers rigidly in place on a rigid interface substrate containing the abovementioned V-grooves. After the filaments have been adhered to the V-groove array, only a small portion of the bottom portions (under sides) of the filaments are exposed for mechanical connection to a mating component. This is because conventional V-groove structures are sufficiently deep to substantially cover the lateral sides of the filaments.

Embodiments of the present invention provide a solution that reduces assembly times, eases bandwidth limitation, and improves manufacturing characteristics with materials and processes that can withstand the higher temperatures and processing speeds of modern SMT assembly lines. The fiber optic interface embodiments described in this disclosure provide a flexible lid with shallow U-grooves or flat bottomed V-grooves that leave most of the lateral sides of the filaments exposed for connection with a mating component. Improved softness of the lid-to-fiber assembly allows for later realignment of the fibers at assembly time when mated to a semiconductor die (for example) that typically includes a V-groove array.

Making the interface less rigid than conventional lids eases the challenge of dimensional matching of the V-groove pitch on the semiconductor die with the V-groove pitch of the lid. This challenge is usually complicated by unavoidable coefficient of thermal expansion (CTE) mismatch between the various materials. The present embodiments avoid this problem through a flexible interface that allows a rigid surface of the mating component to dictate the fine positions of the filaments. The flexible interface (lid) therefore acts as a coarse dimensional reference that maintains the fibers in a sufficiently accurate position for fine realignment dictated by the V-grooves on a rigid surface, such as a semiconductor die. The fiber optic interface also facilitates manufacturing through a unitary (homogeneous) body having integral grooves and adhesive fill features amenable to mass production by injection molding or hot embossing. The adhesive fill features reduce assembly time and result in an improved part that is more robust than current designs while also exceeding SMT manufacturing processing temperatures and dwell times suitable for typical ball grid array (BGA) reflow processes with lead free (PbF) solder.

This interface body is manufactured from a melt-process polymer capable of maintaining mechanical integrity at continuous working temperatures of at least 260° C. without performance degradation. A range of fluoropolymers may be suitable, such as perfluoroalkoxy (PFAs) as well as other polymers. The molded part should demonstrate excellent visible, UV and optical transparency at desired wavelengths while being compatible with high temperature thermal and IR curable adhesives. Suitable materials may have UL-94-V0 rating as well as suitably low CTE and water absorption properties. The molded part should also be flexible and be substantially chemically inert.

One type of pigtail application of the fiber optic interface is shown in FIGS. 1A, 1B, 1C and 1D reproduced from commonly owned U.S. patent application Ser. No. 13/804,269 entitled "Fiber Pigtail with Integrated Lid" filed Mar. 13, 2013, which is incorporated by reference. In this reference, the fiber optic interface 25 is also referred to as the "lid" owing to its position on top of the fiber optic ribbon 20 in the pigtail arrangement. The fiber pigtail 100 includes a fiber optic ferrule 10 attached to one end of the ribbon 20, which includes a number of bare single-mode optical filaments 30, an optical fiber ribbon coating 15 surrounding part of the fiber optic ribbon 20, and an integrated polymer interface or lid 25 permanently attached to the other end of the fiber optic ribbon 20. As arranged in these figures, the fiber optic interface 25 is directly bonded to the upper portions (top sides) of the bare optic filaments 30 while exposing the bottom portions (under sides) and lateral sides of the filaments for connection with a mating component (FIG. 1D), such as a waveguide, semiconductor die, or terminal connector. Although the interface is well suited for use in this type of pigtail arrangement, it will be appreciated that the interface is not specific to this particular pigtail environment and may be used to terminate a fiber optic ribbon in other environments and applications.

Figure 1D:
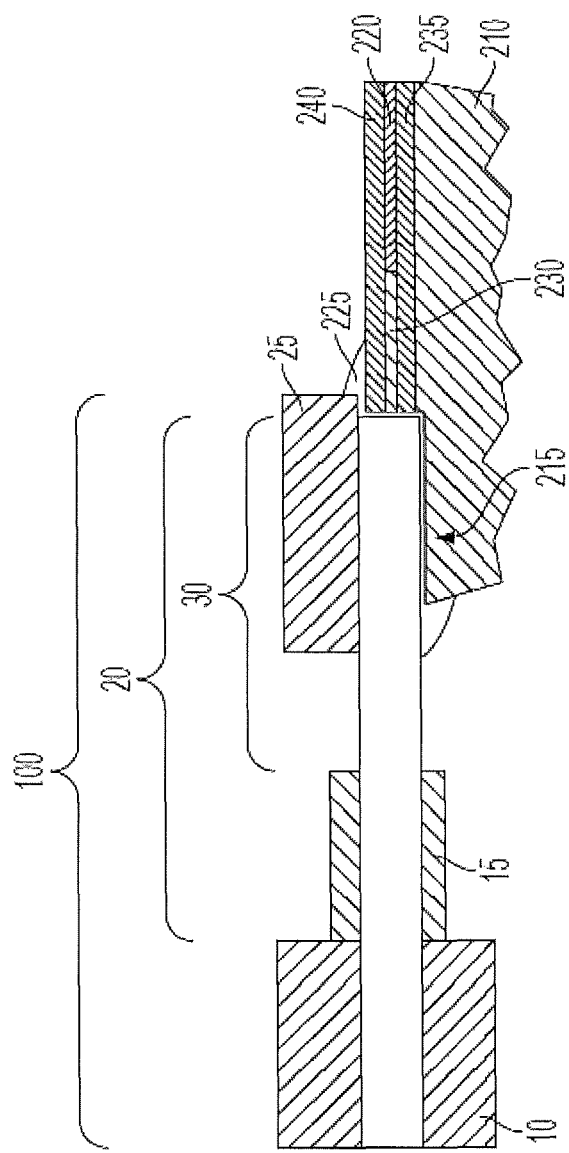
FIG. 1D illustrates a cross-sectional view of the fiber optic interface of FIG. 1A attached to an exemplary mating component.

The fiber pigtail 100 can be incorporated into any system and be attached to a circuit on a surface of a mating component such as a wafer or substrate, for example. FIG. 1D illustrates a cross-sectional view of the fiber pigtail 100 with integrated polymer lid 25 attached to an exemplary mating component 210. In the embodiment depicted, the mating component 210 includes a wafer that may be a diced segment of what is commonly understood as a wafer by one of ordinary skill in the art of semiconductor processing. The wafer 210 has a mechanical engagement feature 215 (e.g., a V-groove of V-groove array or a U-groove of a U-groove array) and a single-mode waveguide 220 in proximity to the bare fiber 30 end of the fiber pigtail 100 (an optionally in physical contact with end of bare fiber 30 near the cylindrical center of said fiber). Each mechanical engagement feature 215 is aligned to its own respective single-mode waveguide 220 to hold each single-mode optical bare fiber 30 in the correct position (i.e., correct predetermined spacing) for optical coupling between each single-mode bare fiber 30 and its respective single-mode waveguide 220. For example, there is an array of bare fibers 30 with each bare fiber 30 sitting in its own mechanical engagement feature 215 (i.e., each bare fiber 30 sits in its own V-groove), and the mechanical engagement features 215 are precisely aligned to their own individual single-mode waveguide 220 on the wafer 210. Accordingly, there is one groove per fiber, and an array of grooves on the wafer 210 matches an array of optical fibers 30. Accordingly, the fiber optic ribbon is a 1×N fiber optic ribbon 20, where N represents the number of individual fibers 30 in the array. A single-mode optical waveguide is a waveguide that can guide only one transverse electric mode and one transverse magnetic mode.

Glue 225 may be applied to hold the fiber pigtail 100 to the wafer 210. There is mechanical contact between a bare fiber 30 and its V-groove (which is the mechanical engagement feature 215) on the wafer 210, which can be held in place by the glue 225. Also, the tip of the bare fiber 30 is in proximity (below 100 μm and preferably (although not a necessity) below 10 μm) to its own single-mode waveguide 220. The single-mode waveguide 220 on the wafer 210 is shaped as or includes a mode size convertor, which is an optical mode converter 230, near the bare fiber 30 end of the fiber pigtail 100. Each single-mode waveguide 220 has its own optical mode converter 230. The optical mode in a single-mode bare fiber 30 may have a diameter of 3 to 15 μm and preferably 9 μm while the single-mode waveguide 220 may have a mode width or height between 0.2 μm and 2 μm and preferably close to 0.5 μm (although not a necessity). The optical mode converter 230 transitions the mode shape from the mode shape of a fiber (at the distal end of the mode converter that is in proximity to a fiber) to the mode shape of a single-mode waveguide 220, as understood by those skilled in the art.

The single-mode waveguide 220 on the wafer 210 is surrounded by a cladding material of refractive index similar to the fiber glass material of the bare fiber 30. The lower cladding 235 has a lower refractive index than the single-mode waveguide 220 (i.e., waveguide core). Upper cladding 240 has a refractive index that is lower than the single-mode waveguide 220. The upper cladding 240 may be optional.

Figure 2:
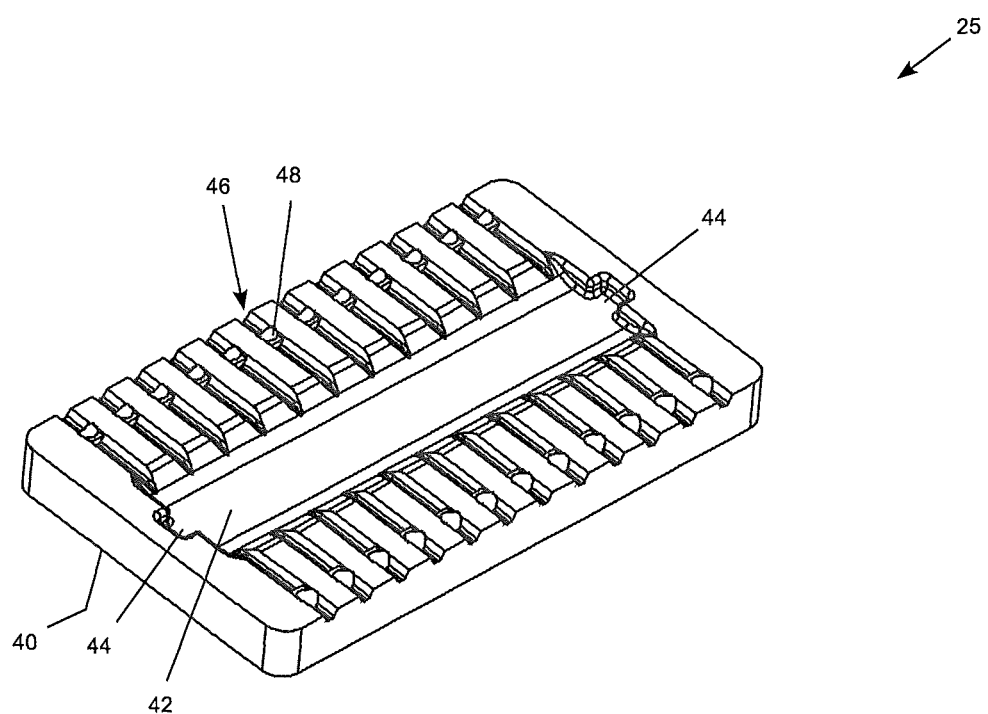
FIG. 2 is a perspective front view of a fiber optic interface including an adhesive fill system in accordance with an embodiment of the invention.

FIG. 2 is a perspective view of the fiber optic interface 25 showing the details of the adhesive fill system. In this embodiment, the interface is formed as an integrated, homogeneous polymer body 40 created by injection molding or hot embossing. An adhesive fill system is integrally formed into the interface body. The only other component utilized for this particular embodiment is an adhesive to attach the interface body to the exposed fiber optic filaments, which is cured with UV or IR light, depending on the type of resin used for the interface body. The optic interface 25 includes a number of shallow U-shaped or flat bottomed V-shaped grooves 46 (only one groove is enumerated to avoid cluttering the figure) with one groove for each filament of the corresponding fiber optic ribbon. There are twelve grooves in this particular embodiment, divided into aligned half-grooves by an adhesive filling well 42 that is inset from the perimeter of the body. Shallow U-shaped or flat-bottomed V-shaped grooves are preferred over conventional V-shaped grooves that can pinch the filaments and/or block access to the lateral sides of the filaments by the mating component. The grooves in this particular embodiment are divided into half-grooves by the adhesive filling well 42, which is somewhat deeper than the grooves to allow an adhesive in the well to flow under the filaments. Each filament is positioned to extend from one half-groove across the well 42 to an aligned half-groove on the opposing side of the well so that the portion of the filament above the well is supported on both sides of the well. One or more filling ports 44 are positioned along the edge of the well, typically at the top and bottom of the well as shown in FIG. 2, for introduction of a gel adhesive into the well. Each half-groove opens to an overflow port 48 that allows excess adhesive to drain or be squeezed out from the space between a filament and the half-groove.

Figure 3:
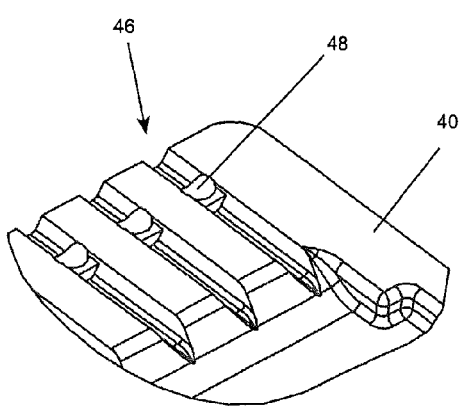
FIG. 3 is a perspective detail view showing adhesive ports forming part of the adhesive fill system in accordance with an embodiment of the invention.
Figure 4:
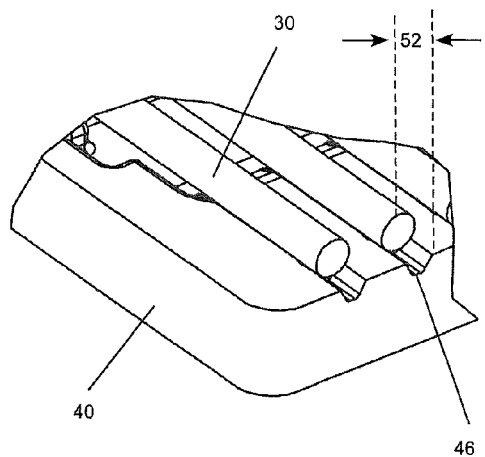
FIG. 4 is a perspective detail view showing the placement of fiber optic filaments on the interface in accordance with an embodiment of the invention.

FIG. 3 is a perspective detail view showing the adhesive overflow port 48, while FIG. 4 is a perspective detail view showing the placement of a fiber optic filament 30 on the interface. The port 48 extends from the groove through the body 40 of the interface to allow adhesive to vent out of the corresponding groove. The filament 30 could be positioned slightly inward from the edge of the body leaving an overhang 52 to protect the end of the filament from damage and stray light. An exemplary overhang 52 should be at least 100 microns but not so large as to leave the port 48 uncovered by the filament.

Figure 5A:
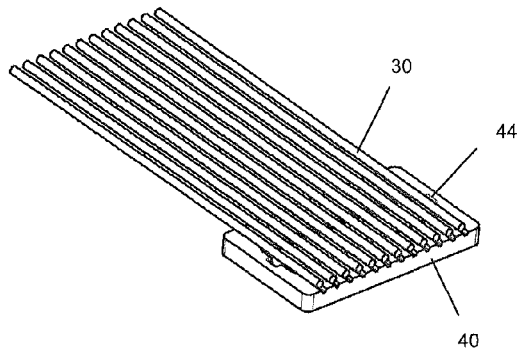
FIG. 5A is a perspective view of the interface showing the placement of fiber optic filaments on the interface in accordance with an embodiment of the invention.
Figure 5B:
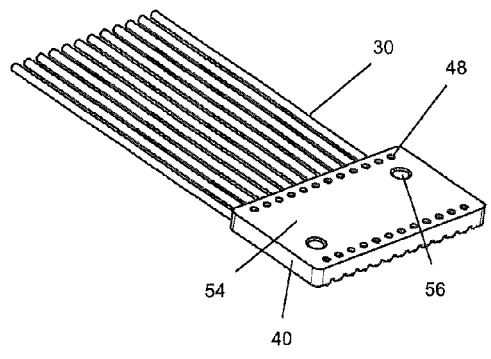
FIG. 5B is another perspective view of the interface showing the placement of fiber optic filaments on the interface.

FIGS. 5A and 5B are perspective views with FIG. 5A showing the placement of the fiber optic filaments on the interface and FIG. 5B showing the rear side 54 of the body 40. In this particular embodiment, vacuum pickups 56 are provided to assist a vacuum tool in picking up the interface. The vacuum tool may be used, for example, to move the interface off an assembly jig after the adhesive has been applied and cured with a blue, UV, or IR light source.

Figure 6:
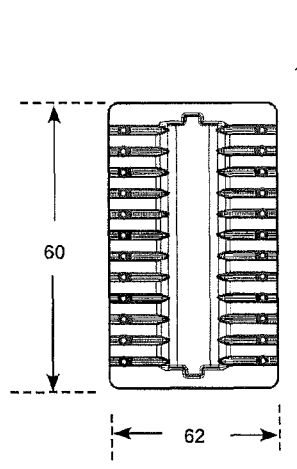
FIG. 6 is a front view of the fiber optic interface showing exemplary dimensions in accordance with an embodiment of the invention.
Figure 7:
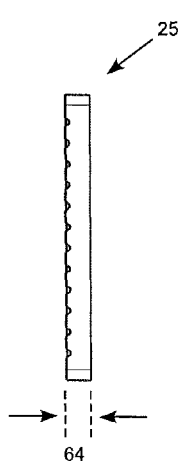
FIG. 7 is a side view of the fiber optic interface showing exemplary dimensions in accordance with an embodiment of the invention.
Figure 8:
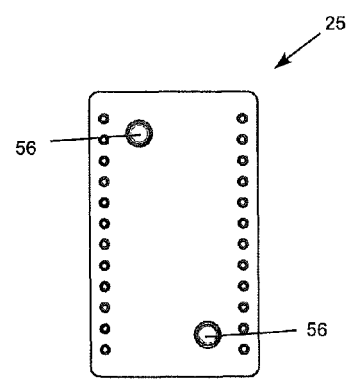
FIG. 8 is a rear view of the fiber optic interface showing exemplary locations for tool connection in accordance with an embodiment of the invention.

FIG. 6 is a front view of the fiber optic interface 25 showing exemplary dimensions of an illustrative embodiment shown generally to scale. This particular interface body has a length 60 transverse to the filaments of 3.8 mm and a width 62 parallel to the filaments of 2.0 mm. The side view of FIG. 7 shows that the body has a thickness of range of 0.25-0.050 mm. The adhesive drainage port 48 may be in the range of 10 to 300 microns (μm) in diameter, such as 60 μm in diameter. The rear view of FIG. 8 shows the relative size and placement of the vacuum pickups in this particular model.

Figure 9:
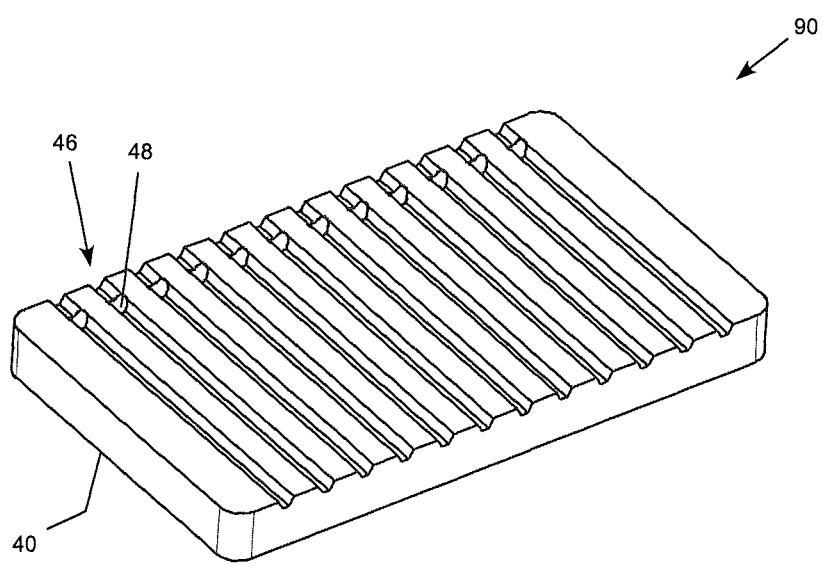
FIG. 9 is a perspective front view of an alternative fiber optic interface including adhesive overflow ports in accordance with an embodiment of the invention.
Figure 10:
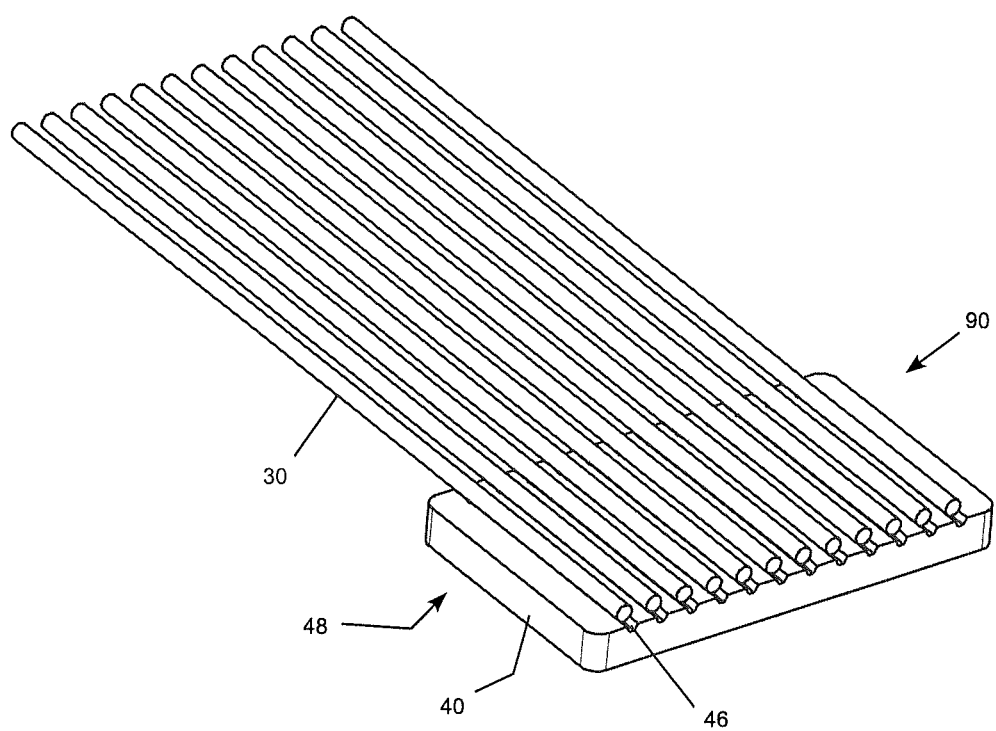
FIG. 10 is a perspective front view of the alternative interface showing the placement of fiber optic filaments on the interface in accordance with an embodiment of the invention.

FIG. 9 is a perspective front view of an alternative fiber optic interface 90 in which the grooves 46 extend across the body 40 and a single adhesive overflow port 48 is provided for each groove. FIG. 10 is a perspective front view of the alternative interface 90 showing the placement of fiber optic filaments 30 on the interface. While this alternative interface does not include an adhesive well, it has the advantage of supporting the filaments 30 across the central portion of the interface where the adhesive well is present in the alternate embodiment shown in FIGS. 2-8. This option may in other respects be similar to the embodiment described previously with reference to FIGS. 2-8.

In a particular embodiment, the polymer material has a melting point above 200° C. and for some materials above 255° C. For example, suitable perfluoroalkoxy polymers (PFAs) have a continuous working temperature of at least 260° C. and a melt temperature of at least 305° C., while suitable fluorinated ethylene propylene polymers (FEPs) have an operating temperature of at least 204° C. and a melt temperature of at least of 260° C. The CTE should be below 40 and preferably below $25 \times 10^{-5}$ m/m. For example, the average CTE of suitable PFAs from 21° C. to 208° C. is typically $18 \times 10^{-5}$ m/m; the average CTE of suitable FEP from 21° C.-208° C. is typically $20.8 \times 10^{-5}$ m/m. Water absorption should be below 0.5% and preferably below 0.1% (according to ASTM D570 standardized test). For example, the water absorption of suitable PFAs for 24 hours is typically less than 0.03%; the water absorption of suitable FEPs for 24 hours is typically less than 0.01%.

Typical material properties of suitable materials for the interface body are summarized in Table A. It will be appreciated that other materials may be used as well.

TABLE A

| Resin | PFA | FEP |
|---|---|---|
| Continuous Working Temp | 260° C. | 204° C. |
| Short Term Working Temp | 280° C. | 250° C. |
| Transmission in Visible Spectrum | 90% in 400-700 nm | 75-80% 350-400 nm |
| Transmission in UV Spectrum | 70-90% 350-400 nm | 75-80% 350-400 nm |
| Melting Point | 302-310° C. | 260-280° C. |

The interface should also maintain adhesion to the fibers and structural integrity despite contact with common solvents such as methanol, acetone, ethanol and ketones, esters, and ethers. It should also be sufficiently flexible to conform to common semiconductor dies by showing significantly smaller modulus than the semiconductor die. For example, the Young's modulus should be below 5 GPa and preferably below 2.4 GPa or 1 GPa. Suitable PFAs have a Flexural Modulus at 23° C. of 695 MPa, and suitable FEPs have a Flexural Modulus at 23° C. of 625 MPa. In general, the interface should be relatively soft at room at 23° C. so that it flexes easily but does not break when pressed against a semiconductor die. In addition, the interface should be amenable to heat molding above the unannealed 66 psi heat deflection temperature and hold for a sufficiently to avoid significant warping when the part is used at higher temperatures.

During assembly of the fiber 30 to the interface 25, a force of between 0.1 to 10 Newtons (N) and typically in the range of 0.5 to 2 N (about one Newton has been found suitable) is used on top of the fibers for the purpose of forcing the fibers into the adhesive in order to maintain dimensional requirements of lid-to-fiber interface. That is, the body of the interface is sufficiently flexible to bend but not break when a force of about one Newton is applied to urge the filaments into the grooves with adhesive located in the grooves, and to squeeze excess adhesive through the overflow ports. The blue, UV or IR curing energy is then transmitted thru and around the clamp plate and fiber in order to eliminate or reduce shadows on the bond line interface that could otherwise have a detrimental effect on full adhesive cure. The clamp plate may be blue, UV or IR transparent, such as a piece of glass/other since the line of sight for the curing source is typically positioned directly above the polymer lid.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A fiber optic interface for a fiber optic ribbon, comprising:

a homogeneous flexible body comprising one or more grooves defined therein, each groove configured to receive a corresponding filament of the fiber optic ribbon;

each groove further configured to receive an adhesive to attach the groove to a first portion of a corresponding filament while leaving a second, opposing portion of the corresponding filament and lateral side portions of the corresponding filament between the first and second portions substantially accessible for connection to a mating component;

an overflow port for each groove providing an opening extending from a corresponding groove through the body of the interface for draining excess adhesive from the groove; and the body further comprising an adhesive well inset from a perimeter of the body, the adhesive well being positioned to receive and spread the adhesive to the first portions of the filaments;

wherein sides of the adhesive well are encompassed by the body, such that a filling port is positioned along the adhesive well, the filling port being configured to receive the adhesive.

2. The fiber optic interface of claim 1, wherein the one or more grooves are divided by the adhesive well, such that another overflow port across the adhesive well is opposite the overflow port.

3. The fiber optic interface of claim 1, wherein the adhesive is curable with ultraviolet (UV) light or near ultraviolet (blue) light.

4. The fiber optic interface of claim 1, wherein the adhesive is curable with infrared (IR) light.

5. The fiber optic interface of claim 1, wherein the mating component is rigid, and the body is sufficiently flexible to permit realignment of the fibers to accommodate connection to the mating component.

6. The fiber optic interface of claim 1, wherein the body is sufficiently flexible to bend but not break when a force of about one Newton is applied to urge the filaments into the grooves with adhesive located in the grooves, and to squeeze excess adhesive through the overflow ports.

7. The fiber optic interface of claim 1, wherein the body comprises a perfluoroalkoxy polymer having a continuous working temperature of at least 260° C. and a melt temperature of at least 302° C.

8. The fiber optic interface of claim 1, wherein the body comprises a fluorinated ethylene propylene polymer having a continuous working temperature of at least 204° C. and a melt temperature of at least of 260° C.

9. The fiber optic interface of claim 1, wherein the body demonstrates an optical spectrum transmission of at least 90% in the range of 350-400 nm.

10. The fiber optic interface of claim 1, wherein the body demonstrates an optical spectrum transmission of at least 70% in the range of 350-400 nm.

11. The fiber optic interface of claim 1, further comprising optical fiducials for machine vision alignment.

12. A fiber optic termination, comprising:
an exposed length of fiber optic filaments; and
an interface, comprising:
　a homogeneous flexible body comprising grooves defined therein, each groove receiving a corresponding filament of the ribbon;
　each groove carrying an adhesive to attach the groove to a first portion of a corresponding filament while leaving a second, opposing portion of the corresponding filament and lateral side portions of the corresponding filament between the first and second portions substantially accessible for connection to a mating component;
　each groove further comprising an overflow port extending from a corresponding groove through the body of the interface; and
　the body further comprising an adhesive well inset from a perimeter of the body, the adhesive well being positioned to receive and spread the adhesive to the first portions of the filaments;
　wherein sides of the adhesive well are encompassed by the body, such that a filling port is positioned along the adhesive well, the filling port being configured to receive the adhesive.

13. The fiber optic termination of claim 12, wherein the body is sufficiently flexible to permit realignment of the fibers to accommodate connection to the mating component.

14. The fiber optic termination of claim 12, wherein the body is sufficiently flexible to bend but not break when a force of about one Newton is applied to the interface.

15. The fiber optic termination of claim 12, wherein the body comprises a perfluorolkoxy polymer having a continuous working temperature of at least 260° C., a melt temperature of at least 302° C., and an optical spectrum transmission of at least 90% in the range of about 350-400 nm.

16. The fiber optic termination of claim 12, wherein the body further an optical spectrum transmission of 70-90% in the range of about 350-400 nm.

17. A method for manufacturing a fiber optic termination, comprising:
forming an interface comprising:
　a homogeneous flexible body having grooves defined therein, each groove receiving a corresponding filament of ribbon length of optical ribbon comprising a plurality of exposed optical filaments;
　each groove carrying an adhesive to attaching the groove to a first portion of a corresponding filament while leaving a second, opposing portion of the corresponding filament and lateral side portions of the corresponding filament between the first and second portions substantially accessible for connection to a mating component; and
　each groove further comprising an overflow port extending from a corresponding groove through the body of the interface;
applying the adhesive in the grooves;
placing the filaments on the adhesive in the grooves with each filament placed adjacent to a corresponding groove;
squeezing the filaments into the grooves with a force sufficient to push excess adhesive from the grooves through the overflow ports;
applying one of: near ultraviolet, ultraviolet or infrared light to the body to cure the adhesive;
providing an adhesive well defined in the body inset form a perimeter of the body; and
filling the adhesive well with the adhesive prior to positioning the filaments adjacent to their corresponding groove to spread the adhesive to spread the adhesive onto a portion of each filament when the filaments are squeezed into their corresponding grooves;
wherein sides of the adhesive well are encompassed by the body, such that a filling port is positioned along the adhesive well, the filling port being configured to receive the adhesive.

18. The method of claim 17, further comprising configuring the body with sufficient flexibility to bend but not break to allow the filaments to seat into their corresponding grooves and squeeze excess adhesive out of the overflow ports when a force of about one Newton is applied to the push the filaments into the grooves.

* * * * *